No. 793,475. PATENTED JUNE 27, 1905.
J. J. ULANDER.
MILK OR OTHER LIQUID STRAINER.
APPLICATION FILED JAN. 27, 1904.
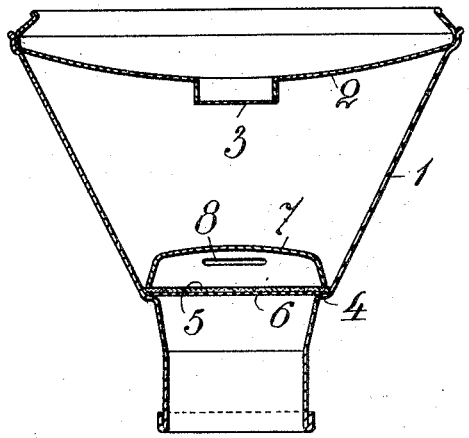
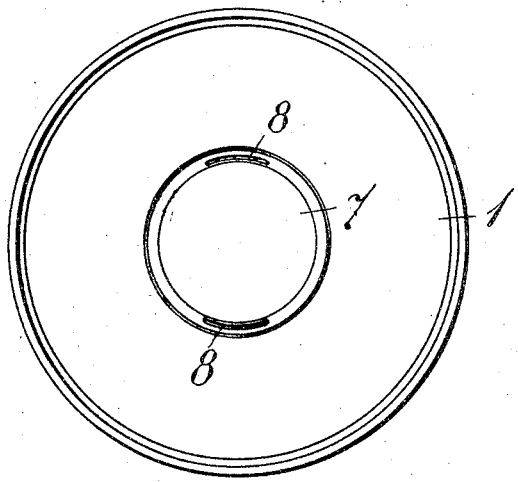
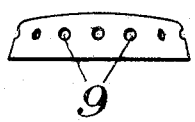
Witnesses
Inventor No. 793,475. Patented June 27, 1905.

UNITED STATES PATENT OFFICE.

JOHAN JAKOB ULANDER, OF EKÖN, MOTALA, SWEDEN.

MILK OR OTHER LIQUID STRAINER.

SPECIFICATION forming part of Letters Patent No. 793,475, dated June 27, 1905.

Application filed January 27, 1904. Serial No. 190,792.

*To all whom it may concern:*

Be it known that I, JOHAN JAKOB ULANDER, a subject of the King of Sweden and Norway, and a resident of Ekön, Motala, Sweden, have invented new and useful Improvements in Milk or other Liquid Strainers, of which the following is a specification, reference being had to the drawings accompanying and forming a part hereof.

This invention relates to improvements in milk or other liquid strainers.

In many cases it is, as well known, desirable, and in certain cases—for instance, in straining or filtering milk—both suitable and necessary to use thin filters. When the filters are made thin, they become, however, if they attain a size sufficient for practical use so frail that they are soon broken into pieces by a jet of liquid even if the latter falls onto the filter from a comparatively small height. It has been tried to protect the filter against the effect of falling jets of liquid by means of cups or the like, arranged above the filters. Such devices heretofore known suffer, however, from the disadvantage that the filter must support the pressure of the liquid column above the filter, on account of which the filter must still be made comparatively thick.

The object of the present invention is to remove the said disadvantage.

The invention consists, briefly, in the provision in a suitable straining or filtering vessel of cups or the like above the filter in such manner that the lower edge of the cup presses more or less tightly against the outer parts of the filter, the said cup being provided in its sides with openings of such size that the pressure inside the cup will be fully or partly removed, so that the stresses on the filter will be reduced to a minimum, allowing the thickness of the filter to be correspondingly reduced.

A special advantage obtained by this device is that the fine solid particles contained in the liquid to be strained will less readily be pressed into the filter, on account of which the latter may be used for a longer time than heretofore In the accompanying drawings I have shown a strainer embodying my invention and especially adapted for straining of milk.

Figure 1 shows a vertical section of the said strainer. Fig. 2 is a top view of the same, the upper vessel being removed; and Fig. 3 shows a modified form of the cup adapted to be placed on the filter.

Referring to the drawings, the strainer consists of a preferably funnel-shaped vessel 1, provided in well-known manner at the upper end with a vessel 2, having an ordinary wire strainer 3 for effecting a preliminary straining of the liquid. On a shoulder 4 or the like on the said vessel 1 is provided a thin filter 5—for instance, of cotton-wool—the said filter being preferably supported by a wire strainer 6. Above the said filter is placed a cup 7 in such manner that the liquid is fully or partly prevented from entering between the lower edge of the cup and the filter. The said cup 7 is provided on its sides and at a distance from its lower edge with narrow slots 8 of such size that the same throttle the liquid when the latter tends to flow into the cup through the said openings, so that the pressure otherwise caused by the liquid column outside the cup will be fully or partly removed. By arranging the said slots 8 at a distance from the lower edge of the cup a residue-space is obtained between the cup and the vessel 1 in which the solid particles contained in the liquid will accumulate, whereby the filter will be maintained clean for a longer time than otherwise.

Instead of the slots 8 shown in Figs. 1 and 2 openings of any other shape may be used—for instance, small circular orifices 9, as illustrated in Fig. 3.

Having now particularly described my invention and in what manner the same may be performed, what I claim as new, and desire to secure by Letters Patent, is—

In a liquid-strainer the combination, of a funnel, a vessel in the upper part of the said funnel, a wire strainer in the said vessel, another wire strainer in the lower part of the said funnel, a filter on the last-mentioned wire strainer, and a cup on the said filter provided with openings some distance from its lower edge, the said openings being of such size as to fully or partly remove the pressure inside
5 the cup otherwise caused by the liquid column outside the said cup, substantially as and for the purpose set forth.

In testimony whereof I have signed my name to this specification in the presence of two subscribing witnesses.

JOHAN JAKOB ULANDER.

Witnesses:
CARL P. GERELL,
AGDA MEYERSON.